Aug. 25, 1959
E. C. SCHROM
2,901,693
FAULTY COIL DETECTOR
Filed Sept. 27, 1955
3 Sheets-Sheet 1
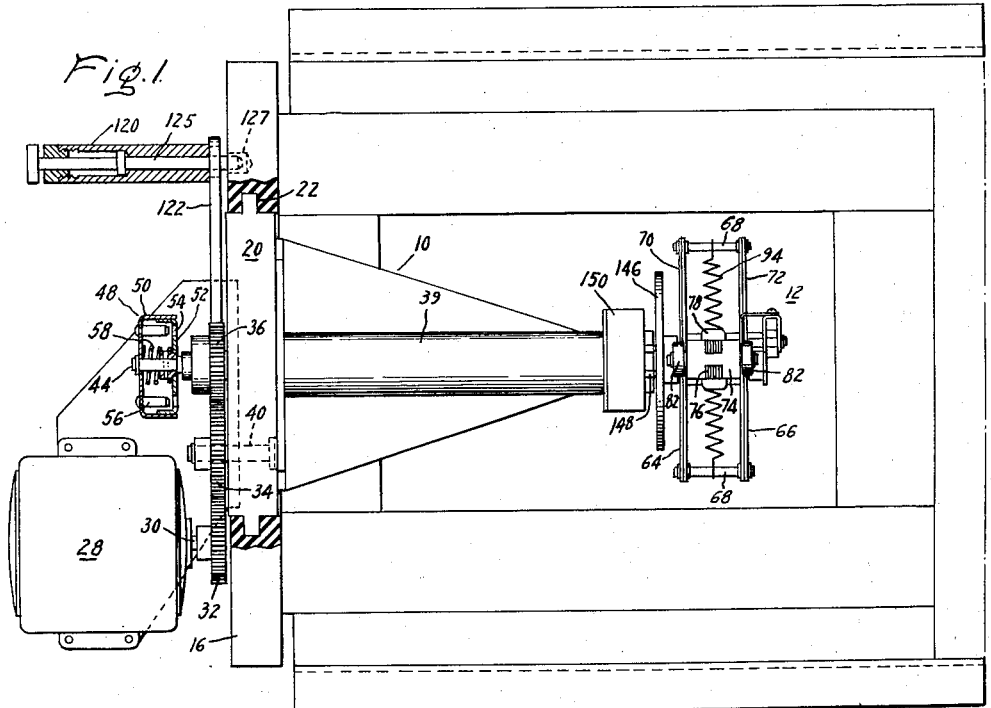
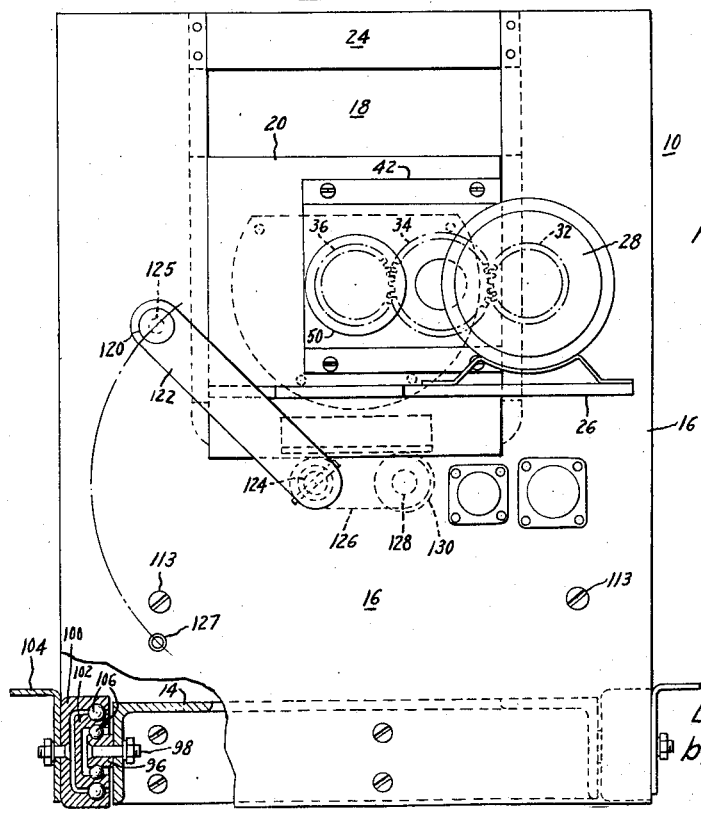
Inventor:
Edward C. Schrom,
by
His Attorney.

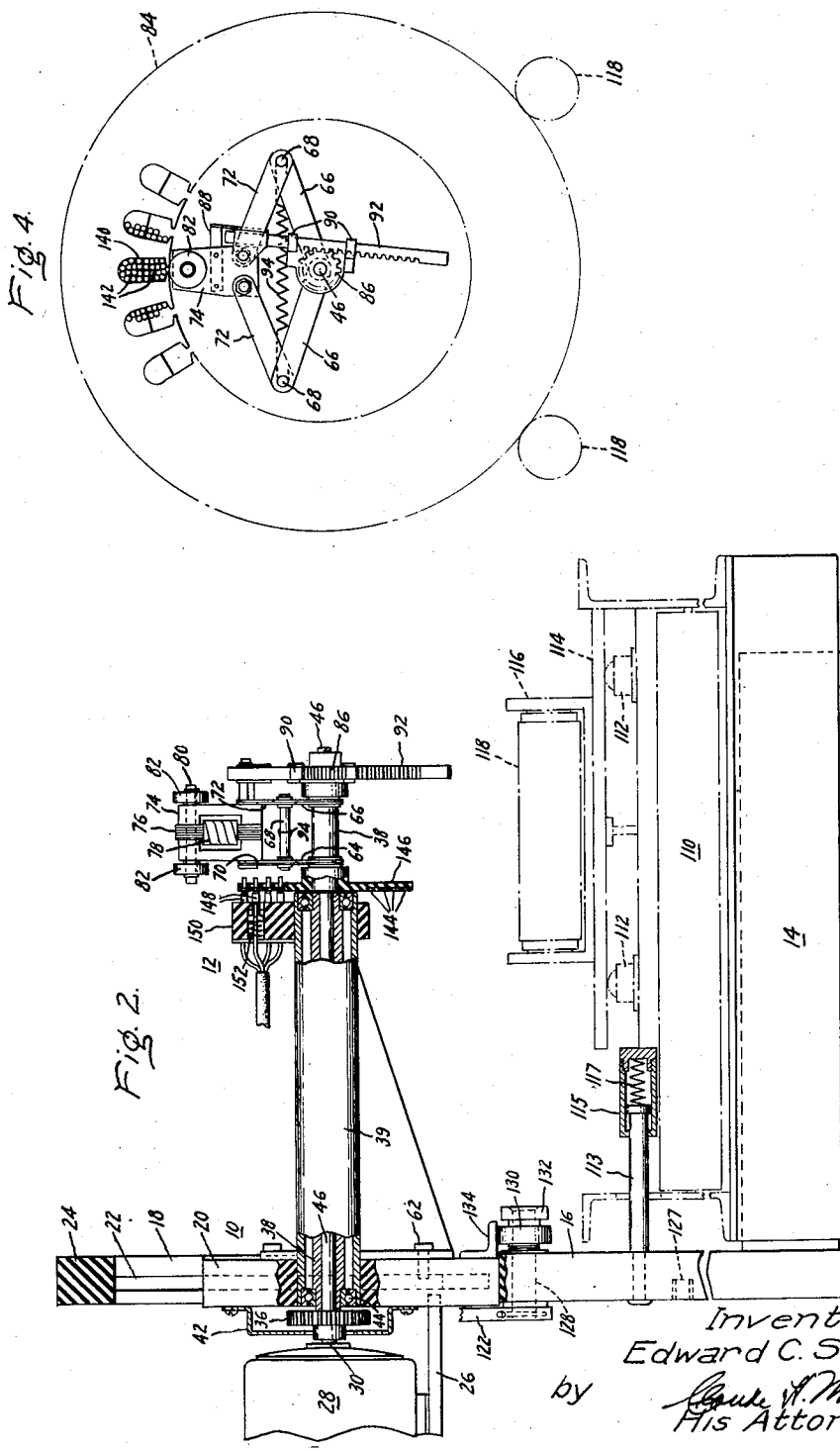

Aug. 25, 1959     E. C. SCHROM     2,901,693
FAULTY COIL DETECTOR

Filed Sept. 27, 1955     3 Sheets-Sheet 3

Inventor:
Edward C. Schrom,
by
His Attorney.

United States Patent Office 2,901,693
Patented Aug. 25, 1959

2,901,693
FAULTY COIL DETECTOR

Edward C. Schrom, Schenectady, N.Y., assignor to General Electric Company, a corporation of New York Application September 27, 1955, Serial No. 536,835

8 Claims. (Cl. 324—52)

The invention described herein relates to dynamoelectric machine coil testing apparatus and more particularly to a faulty coil detector utilized in determining the exact location of a defective coil or winding wound in a slot of a stator and has for its object the provision of apparatus capable of discovering and precisely locating turn to turn, phase to phase, and turn to ground faults appearing in the coils of dynamoelectric machines.

A customary practice employed in the motor and generator manufacturing industry is to subject the coils of three-phase stators of dynamoelectric machines, prior to their assembly into a complete unit, to a voltage test for determining whether any of the coils are so defective as to adversely affect operation of the machines. This is accomplished by subjecting the individual coils to surges of high voltage by a surge generator, such as shown and described in Patent Nos. 2,094,472 and 2,321,424 issued to Nicholas Rohats and assigned to the assignee of the present invention, and simultaneously observing on an oscilloscope the particular fault residing in any one of the coils. This procedure is effective in detecting a faulty coil, but the testing apparatus is not capable of providing information showing which slot of the stator contains the defective coil.

In carrying out the invention, a detector or electrical responsive device is provided which discovers the exact slot containing a defective coil and furnishes a positive indication of its location. The apparatus generally consists of pickup coils rotatably mounted inside a stator core and arranged to pass over slots in the inner peripheral surface of the stator. The pickup coils are responsive to the aforementioned high voltage surges impressed on the stator coils, which develops a signal in the pickup coils that is fed to an electronic device having an electrical indicating meter connected in circuit therewith. The meter is calibrated in such manner that a faulty stator coil will be readily detected because of a change occurring in the meter reading when the pickup coils travel over a slot containing the defective stator coil.

For a more complete understanding of the invention as well as other objects and advantages as will hereinafter more fully appear, and which will be more particularly pointed out in the appended claims, reference is now made to the following description taken in connection with the accompanying drawings in which:

Figure 1 is a plan view of a faulty coil detector utilized in determining the presence of defective coils in a machine;

Figure 2 is a view in elevation, partly in section, of the faulty coil detector shown in Figure 1;

Figure 3 is a side view of the apparatus of Figure 2 showing an arrangement for elevating the detector on a supporting member;

Figure 4 is a view in elevation showing in detail the structural members for supporting pickup coils;

Figure 5:
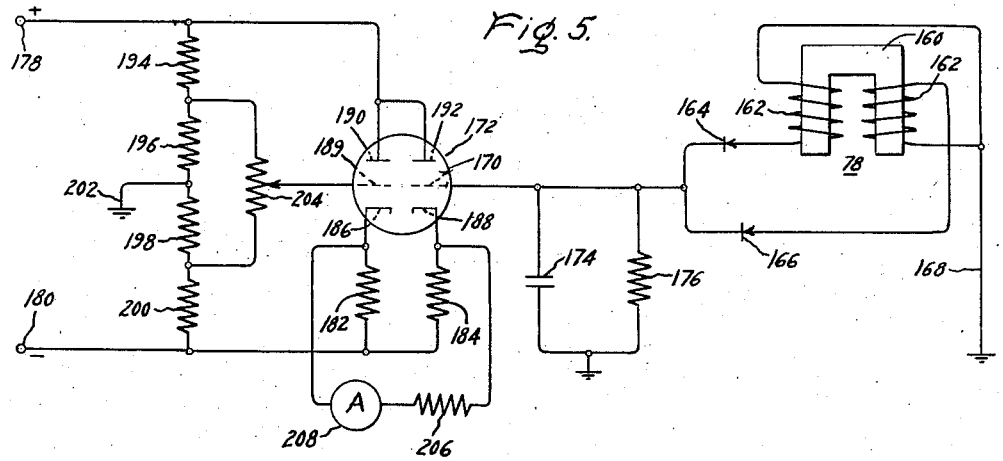
Figure 5 shows a circuit used with the detector in discovering faults in a delta connected motor.

Referring now to the drawings wherein like reference characters designate like or corresponding parts throughout the several views, there is shown in Figures 1 through 4 a faulty coil detector utilized in discovering the exact slot of a stator containing a faulty coil or winding. The apparatus generally consists of three principal elements; namely, a vertically adjustable supporting device 10 carrying the operable parts of the apparatus, a framework 12 rotatably mounting the detecting or pickup coils 78, and electrical circuits shown in Figures 5 and 6 for alerting an operator to the presence of a defective coil in a stator. The faulty coil detector disclosed herein has particular utility in detecting faulty coils in stators for dynamoelectric machines and the invention is presented hereinafter in conjunction with such machine, although it will be obvious to those skilled in the art that it can be applied with equal facility to other electrical apparatus depending on coils for their successful operation.

Turning more specifically now to the supporting device 10 shown in Figures 1 through 3, there is shown a chassis or base 14 interconnected with a vertical panel 16 used for supporting the operative parts of the detector. The panel 16 is provided with an opening 18 for receiving a vertically adjustable slide 20 which is positioned in the panel 16 by a coacting tongue and groove arrangement 22. Attached to the upper end of the panel is a stop member 24 arranged to prevent removal of the slide when raised to its uppermost position.

The slide 20 is made movable for a reason hereinafter more fully set forth, and carries with it the following described parts when raised vertically in panel 16.

A motor support 26 attached to slide 20 serves as a rigid base for a constant speed A.C. motor 28 having enclosed gears which reduce the speed on the output shaft from 30 to 1 r.p.m. Rotary motion from the output shaft is transmitted through attached spur gear 32 and idler gear 34 to gear wheel 36 which is rigidly mounted on hollow shaft 38. Gear 34 is supported on the panel 20 by a pin 40 and all of the gears are enclosed by a guard 42 likewise fixed to panel 20.

The hollow shaft 38 is journaled in ball bearings 44 fitted in each end of housing 39 and is designed to receive a second shaft 46 which extends outwardly through panel 20 and terminates in a coil adjusting knob 48. The knob 48 comprises a cup 50 telescopically mounted on a plate 52 provided with openings 54 engageable by stud members 56 fixed to the inner surface of the cup. Spring 58 normally biases the cup and attached studs to a disengaged position. When rotation of shaft 46 is desired and for a purpose hereinafter described, the cup is merely pressed inwardly until the studs engage the matched openings whereupon a manual turning of knob 48 results in imparting rotary movement to the shaft.

Referring now to the framework 12 mounting the pickup or detecting coils 78, it will be seen that both shafts 38 and 46 extend outwardly from an open end of housing 39. Two pair of spaced, lower, framing arms 64 and 66 extend outwardly from and are respectively affixed at one end to shaft 38 so as to rotate therewith, and terminate at their other ends in pins 68. The pins serve as pivot points for two pair of upper framing arms 70 and 72 having their upper ends likewise pivoted on a block 74 of non-magnetic material.

The block 74, as seen in Figure 2, consists of a pair of U-shaped members spaced by laminations 76 upon which is mounted pickup coils 78. The outermost end of the block 74 is bored for receiving a pin 80 which supports a pair of wheels 82 adapted to contact the inner peripheral surface of a stator 84. It will be evident that with stator 84 stationary, the block 74 will be caused to travel over the inner surface of the stator when shaft 38 is rotated because the arms 64, 66, 70 and 72 directly interconnect the shaft with the block.

In order to provide the apparatus with flexibility in adapting it for use with stators having different diameters, adjustable coacting parts are incorporated in the structure. These parts consist of a pinion gear 86 attached to the outermost end of inner shaft 46. A bracket 88 attached to block 74 and rack guides 90 serve to position a rack gear 92 in meshing engagement with pinion gear 86. Biasing spring 94 connected at its ends respectively to pins 68 acts to draw the lower and upper arms 64, 66, 70 and 72 to a closed position, in which case the block would be extended to its maximum length, and this is the position that the block normally assumes when not fitted within a stator. It is to be noted that the rack and pinion is actuated in response to movement of inner shaft 46 which is rotated by a manual turning of adjusting knob 48, Figure 1. Also, the rack and pinion is employed only to draw the block inwardly toward shaft 46 since outward movement of the block is achieved by the biasing action of spring 94 as heretofore explained.

The outer shaft 38 is utilized for rotating the device 12 about the inner peripheral surface of the stator.

An additional adjustable feature of the apparatus is that the panel 16 is slidable in and out of base 14 so as to avoid manual handling of the stators when delivered to the detecting device for testing. The base or chassis 14 may be selectively affixed to any type of support or framework as shown in Figure 3. A bar 96 extends the length of the chassis and is attached thereto by a nut and bolt 98 in such manner as to provide the outer surface of the bar with a smooth face. A pair of spaced slides 100 and 102, the former being attached to the panel by a slide support 104, coact with the horizontal bar 96 through ball bearings 106. It will be evident from Figure 2 that the panel 16, including all its supported equipment, is movable horizontally to the right and left by virtue of the sliding action obtainable by slides 100 and 102 on bar 96 attached to the chassis.

The purpose of providing horizontal adjustability of panel 16 is to eliminate manual handling of the stators both before and after testing. The stators are delivered to the test site in one arrangement, by a conveyor consisting of a movable belt 110 carrying a base having a central supporting post and a plurality of bearings 112 upon which is placed a plate 114 arranged for rotary movement. Mounted on the plate is a U-shaped bracket 116 holding a plurality of rollers 118 between which is placed the stators to be tested. It is obvious from the above described structure that the panel 16 is manually moved to the left on slides 100 and 102, as shown in Figure 2, when the belt 110 moves a stator into position for testing. When the center line of the stator is in alignment with shaft housing 39, panel 16 is returned to the right to a position where the pickup coils 78 are equidistant from the ends of the stator. In order to prevent the transmission of an undue force to panel 16 when the latter is moved into position, a shaft 113 has one end firmly attached to the panel and terminates at its other end in a housing 115. Spring 117 biases the housing toward the base and absorbs the shock when the panel 16 is moved inwardly into contact with the base.

In other installations, the conveyor is raised considerably above the chassis 14, thereby preventing alignment of shaft housing 39 with the stator. Provision for this is made by adjustably mounting slide 20 for vertical movement in panel 16 as heretofore described. The slide 20 is raised by a handle 120 having a lever arm 122 which terminates in a pivot pin 124 attached to the slide. Link 126 interconnects pin 124 with a bushing 128 having a bearing wheel 130 held thereon by a bolt 132. An angle iron support 134 attached to slide 20 coacts with the bearing wheel 130 for raising the slide when the handle is moved to a slide raising position. Reference to Figure 3 will show that the lever arm 122 and link 126 pivot about pin 124 when the handle is moved in one direction or the other. The slide may be fixed in any one of a number of positions by inserting plunger 125 in bored opening 127 provided in a side of stationary panel 16.

The stator 84 is of a common type having slots 140 containing coils or conductors 142. The several slots shown disclose the conductors on only one side of the stator and the showing is made for illustrative purposes only. As mentioned above, surges of high voltage from the surge generator are applied to coils 142 which induces a signal voltage in coils 78, thereby causing a current to flow through conductors interconnecting the coils with slip rings 144 fixed in disc 146, as shown in Figure 2. The disc is mounted on shaft 38 and accordingly rotates in unison with the pickup coils. A plurality of brushes 148, each respectively being in alignment with its corresponding slip ring are supported by a brush holder 150 mounted on shaft housing 39. As in usual brush holder construction, the brushes are biased to a contacting position by a spring pressed plunger 152, one of such being shown in detail in Figure 2.

Figure 6:
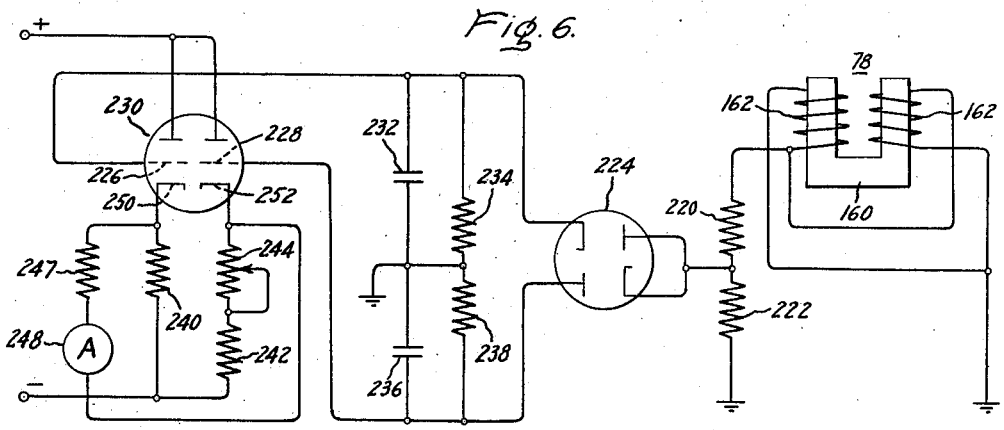
Figure 6 shows a circuit used with the detector in discovering faults in a Y connected motor.
Figure 7:
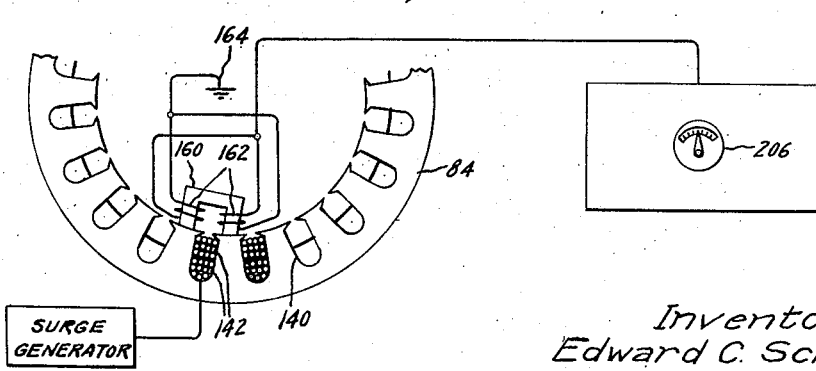
Figure 7 is a diagrammatic showing of pickup coils on a motor stator and by block diagram, the electrical circuits connected therewith.

In order to have the signal voltage induced in pickup coils 78 effect movement of an indicator for showing an operator the presence of a defective stator coil, two separate circuits are provided, one for use with delta connected stators as shown in Figure 5 and the other for use with Y connected stators, shown in Figure 6. Different circuits are necessary for use with these types of motors because the attenuation of voltage in the coils therein is so great that all of the various types of faults in the coils cannot be detected by one circuit.

Referring now to Figure 5, the pickup coils 78 consist of a laminated iron core 160 having coils 162 wound on each leg; one lead from each coil terminating in its respective rectifier 164 and 166 while the other two leads are grounded through conductor 168. The output of rectifiers 164 and 166 is fed to the grid 170 of twin triode 172 and the grid voltage thereon is sustained by the capacitor 174 and resistor 176. The other half of twin triode 172 is fed from terminals 178 and 180 through a voltage divider network consisting of resistors 194 and 196 in the positive side of the power supply, and resistors 198 and 200 in the negative side, which are centrally grounded at 202. Resistor 204, connected across resistors 196 and 198, is provided with a movable arm connected to provide a signal to grid 189 for balancing the cathodes.

A regulated power supply (not shown) supplies direct current voltage across terminals 178 and 180 having the polarity as indicated. Cathode resistors 182 and 184 are connected to the negative side of the line and a microammeter 208 having a serially connected resistor 206 utilized in decreasing the sensitivity of the meter, is connected across the cathodes for reading the current therebetween. Plates 190 and 192 complete the circuit through the tube 172 to the positive terminal 178.

In normal operation, a stator coil is subjected to surges of high voltage and when the pickup coils 78 bridge one of the slots, a voltage is induced therein which is fed to full wave rectifiers 164 and 166. A sum of the signals from the rectifiers is applied to the grid 170 and meter 208 registers the difference existing between the cathodes in tube 172. The meter will show a nominal value when the coil under test does not contain a turn to turn, phase to phase, and turn to ground fault. However, in the event the coil is defective in any one of these respects, a large voltage will be induced in the pickup coils which ultimately cause an abrupt increase in meter reading, thereby indicating the presence of a defect in the stator to the operator. The above described system is principally utilized in finding faults in 3 phase delta connected stators.

Figure 6 shows the circuit for use with Y connected stators. A voltage divider, consisting of resistors 220 and 222, divides the output voltage of pickup 78 and provides a signal voltage to twin diode tube 224. Each diode respectively passes both positive and negative voltage peaks to their respective grids 226 and 228 in tube 230. As in the circuit of Figure 5, the condenser 232 and resistor 234 comprise an R-C circuit for maintaining the voltage level on grid 226, while condenser 236 and resistor 238 comprise another R-C circuit for supporting the voltage level on grid 228. Cathode resistors 240 and 242 are connected to their respective cathodes and variable resistor 244 is utilized for balancing the circuit. Resistor 247 is inserted in series with meter 248 for decreasing the sensitivity of the instrument.

The detecting coil 78 registers a nominal value when searching slots in which coils are subjected to high voltage surges as in the embodiment described above. As it passes over a defective slot, there will be an abrupt change in the signal voltage and the meter will give a peak reading on both sides of the coil containing the fault. The pickup voltage is an oscillating type signal and the device is therefore capable of detecting a fault on a large negative peak or a large positive peak or a combination of both so that the signal coming from the twin diode 224 is applied to the grids of tube 230 and the meter 248 accordingly measures the current between the cathodes. The reading on the instrument actually registers the algebraic sums of the peaks.

Operation

In operation, when a stator is delivered to the test site on rollers 118 supported by conveyor 110, Figure 2, the panel 16 is moved to the right until the framework 12 is centrally positioned within the stator. If the conveyor is of a height preventing alignment of the framework 12 within the stator, handle 120 is actuated to move slide 20 upwardly to a point where such alignment is achieved. Further, to facilitate insertion of the framework therein, adjusting knob 50 is engaged, turning inner shaft 46 which actuates rack and pinion gears 92 and 86 for drawing the pickup coils 78 inwardly toward the shaft, thereby providing a clearance between the pickup coils and inner surface of the stator.

With the parts positioned as shown in Figure 4, motor 28 is energized causing outer shaft 38 to rotate at approximately one r.p.m., although other speeds obviously could be used. Since the lower and upper arms 64, 66, 70 and 72 are attached to the shaft, they rotate therewith, thereby moving pickup coils 78 over the inner peripheral surface of the stator. The voltage surge tester energizes each winding in unison with movement of the pickup coil over the respective slot for inducing a signal voltage in the coil. The signal is taken off through slip rings 144 and delivered to either of the circuits shown in Figures 5 and 6 according to the type of motor being tested, for energizing indicator 208 or 248 to show the location of a faulty slot. The meter will show a standard deflection for good windings and when a faulty winding is contacted, a large increase will be made in the indicator, thereby showing the presence of a faulty coil. When testing is completed, the pickup coils 78 are withdrawn from contact with the stator surface by the rack and pinion gears and the panel 16 is then pulled to the left, moving smoothly on slides 96 and 102, thereby effecting a withdrawal of the framework 12 from the stator.

Obvtiously many modifications and variations of the present invention are possible in light of the above teachings. For example, it is believed fully within the scope of this invention to obtain rotary motion of the pickup coil around the stator by manual operation where circumstances surrounding the testing process calls for this action. Likewise, the means for transmitting a signal voltage from the pickup coil to a circuit incorporating the indicating device could be made by direct connection where manual operation is employed, rather than through the slip ring arrangement disclosed. It is therefore to be understood that within the scope of the appended claims, the invention may be practiced otherwise than as specifically described.

What I claim as new and desire to secure by Letters Patent in the United States is:

1. A detector for discovering faulty coils wound in a stator for a dynamoelectric machine comprising electrical responsive means adapted for positioning adjacent the inner peripheral surface of said stator, a motor having a shaft connected with said responsive means for rotating the latter at a predetermined speed over slots containing coils arranged in said stator, and electrical indicating means connected with said responsive means so that the energization of any one of said coils causes production of a signal voltage in said responsive means for actuating said indicating means when said responsive means is moved adjacent an energized coil by said motor.

2. The combination according to claim 1 wherein adjusting means are connected with said responsive means for moving the latter normal to the longitudinal axis of said stator.

3. A detector for discovering faulty coils wound in a stator for a dynamoelectric machine comprising a motor attached to a movable slide fixed in a panel and having a shaft terminating in a supporting member, electrical responsive means attached to said supporting member and being adapted for positioning adjacent the inner peripheral surface of said stator, adjusting means interconnecting said supporting member with said responsive means for moving the latter transversely of the longitudinal axis of said stator, and indicating means connected with said responsive means for showing the location of a faulty coil when said responsive means is moved by said motor over energized coils in said stator.

4. A detector for discovering faulty coils wound in a stator for a dynamoelectric machine comprising electrical pickup coils adapted for positioning adjacent the inner peripheral surface of said stator, a motor having a shaft connected with said pickup coils for rotating the latter at a predetermined speed over slots in said stator arranged for holding said stator coils, and electrical indicating means connected with said pickup coils for showing the location of a defective coil in said stator when said pickup coils respond to a voltage impressed on said stator coils, said indicating means comprising full wave rectifier means connected with said pickup coils for receiving a signal voltage therefrom, balanced amplifying means connected to receive a sum of voltages from said rectifier means, and an indicator associated with said amplifying means for showing an unbalance of the latter upon receipt of said voltages from said rectifier.

5. A detector for discovering faulty coils wound in a stator for a dynamoelectric machine comprising a motor having a shaft terminating in a supporting member, electrical responsive means attached to such supporting member and arranged for rotation by said motor around the inner peripheral surface of a stator so that energization of a coil in said stator adjacent said responsive means causes a voltage to be induced in the latter, and indicating means connected with said responsive means for indicating the loaction of a faulty coil in said stator, said indicating means comprising detecting means arranged to pass positive and negative peaks of the voltage induced in said responsive means and being connected between said responsive means and the grids of a dual triode tube, and an indicator connected across the cathodes of said triode tube responsive to the algebraic sum of voltage impressed on said grids for showing the presence of a faulty coil in said stator.

6. A detector for discovering faulty windings wound on a stator for a dynamoelectric machine comprising a vertical panel, a motor supported on a movable slide in said vertical panel and having a shaft terminating in a framework for holding electrical pickup coils arranged for rotation by said motor about the inner peripheral surface of a stator having slots containing coils, slip rings adjacent said framework having contactors connected with said pickup coils for delivering a voltage induced therein to an indicating device capable of detecting variations in current flow in said pickup coils, a second shaft rotatively mounted in said motor shaft having one end terminating in a pinion, a rack attached to said framework arranged to coact with said pinion for effecting lateral adjustment of said pickup coils relative to said stator so as to compensate for stators having different diameters and an adjusting knob attached to the other end of said second shaft for effecting movement of said rack and pinion.

7. The combination according to claim 6 wherein handle means are pivotally mounted on said vertical panel and connected with said movable slide for vertically positioning said detector with respect to said stator.

8. The combination according to claim 6 wherein said vertical panel is supported on a pair of slides capable of providing horizontal movement of said vertical panel with respect to said stator.

References Cited in the file of this patent

UNITED STATES PATENTS

| | | |
|---|---|---|
| 2,595,611 | Simpson | May 6, 1952 |
| 2,641,841 | Ladrach | June 16, 1953 |
| 2,704,824 | Ward | Mar. 22, 1955 |
| 2,752,568 | Ward | June 26, 1956 |

FOREIGN PATENTS

| | | |
|---|---|---|
| 831,117 | Germany | Feb. 11, 1952 |